(12) United States Patent
Droux et al.

(10) Patent No.: US 8,478,877 B2
(45) Date of Patent: Jul. 2, 2013

(54) ARCHITECTURE-AWARE ALLOCATION OF NETWORK BUFFERS

(75) Inventors: Nicolas G. Droux, San Jose, CA (US); Sunay Tripathi, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 714 days.

(21) Appl. No.: 12/711,711

(22) Filed: Feb. 24, 2010

(65) Prior Publication Data

US 2011/0208873 A1     Aug. 25, 2011

(51) Int. Cl.
*G06F 15/16* (2006.01)
*G06F 12/00* (2006.01)

(52) U.S. Cl.
USPC ............ 709/226; 709/212; 709/250; 711/148

(58) Field of Classification Search
USPC ............. 709/212, 226, 250; 710/22; 711/147, 711/148
See application file for complete search history.

(56) References Cited

U.S. PATENT DOCUMENTS

| | | | |
|---|---|---|---|
| 6,105,122 A * | 8/2000 | Muller et al. ..................... 712/1 |
| 6,115,804 A * | 9/2000 | Carpenter et al. .............. 712/28 |
| 6,148,361 A | 11/2000 | Carpenter et al. |
| 6,650,640 B1 * | 11/2003 | Muller et al. ................. 370/392 |
| 7,444,637 B2 * | 10/2008 | Pronovost et al. ............ 718/104 |
| 7,472,234 B2 * | 12/2008 | Landry .......................... 711/147 |
| 7,631,309 B2 * | 12/2009 | Wilt et al. ..................... 718/104 |
| 8,001,266 B1 * | 8/2011 | Gonzalez et al. ............. 709/238 |
| 2003/0105828 A1 * | 6/2003 | Sano et al. .................... 709/212 |
| 2007/0204113 A1 * | 8/2007 | Landry ......................... 711/154 |

* cited by examiner

*Primary Examiner* — Douglas Blair
(74) *Attorney, Agent, or Firm* — Osha Liang LLP (57) ABSTRACT

A computer readable medium comprising software instructions for: obtaining an allocation policy by a MAC layer executing on a host; receiving, a request for a transmit kernel buffer (TxKB) by a sending application executing on at least one processor of the host; obtaining a location of a plurality of available TxKBs on the host; obtaining a location of at least one available network interface on the host; obtaining a location of the sending application; allocating one of the plurality of available TxKBs to obtain an allocated TxKB, wherein the one of the plurality of available TxKBs is selected according to the allocation policy using the location of the plurality of available TxKB, the location of the at least one available network interface, and the location of the sending application, to obtain an allocated TxKB; and providing, to the sending application, the location of the allocated TxKB.

18 Claims, 12 Drawing Sheets

ARCHITECTURE-AWARE ALLOCATION OF NETWORK BUFFERS

BACKGROUND

Network traffic (typically in the form of packets) is transmitted from a sending application to a receiving application. Each of the sending and receiving applications are generally associated with a network stack used to process incoming and outgoing traffic. Part of the data processing may involve the use of kernel buffers to temporarily store the incoming or outgoing data. Some modern computing system architectures utilize physically and conceptually separated nodes to leverage the speed of computing hardware. In such architectures, kernel buffers used by the network stack may be located in various physical locations on the computer, and may be conceptually separated from a sending or receiving application.

SUMMARY

In general, in one aspect, the invention relates to a computer readable medium comprising software instructions, which when executed by a processor, perform a method, the method comprising: obtaining an allocation policy by a media access card (MAC) layer executing on a host; receiving, by the MAC layer, a request for a transmit kernel buffer (TxKB) by a sending application executing on at least one processor of the host; obtaining, by the MAC layer, a location of a plurality of available TxKBs on the host; obtaining, by the MAC layer, a location of at least one available network interface on the host; obtaining, by the MAC layer, a location of the sending application; allocating, by the MAC layer, one of the plurality of available TxKBs to obtain an allocated TxKB, wherein the one of the plurality of available TxKBs is selected according to the allocation policy using the location of the plurality of available TxKB, the location of the at least one available network interface, and the location of the sending application, to obtain an allocated TxKB; and providing, to the sending application, the location of the allocated TxKB.

In general, in one aspect, the invention relates to a system for allocating network buffers, comprising: a host comprising: a plurality of nodes, wherein each of the plurality of nodes comprises: a processor; and a kernel level memory; a media access card (MAC) layer, configured to: obtain an allocation policy; receive a request for a transmit kernel buffer (TxKB) by a sending application executing on a first one of the plurality of nodes; obtain a location of a plurality of available TxKBs; obtain a location of at least one available network interface; obtain a location of the sending application; allocating one of the plurality of available TxKBs to obtain an allocated TxKB, wherein the one of the plurality of available TxKBs is selected according to the allocation policy using the location of the plurality of TxKB, the location of the at least one available network interface, and the location of the sending application, to obtain an allocated TxKB; and providing, to the sending application, the location of the allocated TxKB.

In general, in one aspect, the invention relates to a computer readable medium comprising software instructions, which when executed by a processor, perform a method, the method comprising: obtaining an allocation policy by a media access card (MAC) layer executing on a host; receiving, by the MAC layer, a request for a receive kernel buffer (RxKB) by a network interface; obtaining, by the MAC layer, a location of a plurality of available RxKBs on the host; obtaining, by the MAC layer, a destination associated with the request for a RxKB; obtaining, by the MAC layer, a location of the network interface; allocating, by the MAC layer, one of the plurality of available RxKBs to obtain an allocated RxKB, wherein the one of the plurality of available RxKBs is selected according to the allocation policy using the location of the plurality of available RxKB, the destination associated with the request for a RxKB, and the location of the network interface to obtain an allocated RxKB; and providing, to the network interface, the location of the allocated RxKB.

DETAILED DESCRIPTION

Exemplary embodiments of the invention will be described with reference to the accompanying drawings. Like items in the drawings are shown with the same reference numbers.

In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the invention relate to managing the allocation of receive and transmit buffers more efficiently in modern computer architectures. More specifically, embodiments of the invention relate to a method and system for efficiently allocating buffers by utilizing knowledge of the system architecture.

Figure 1:
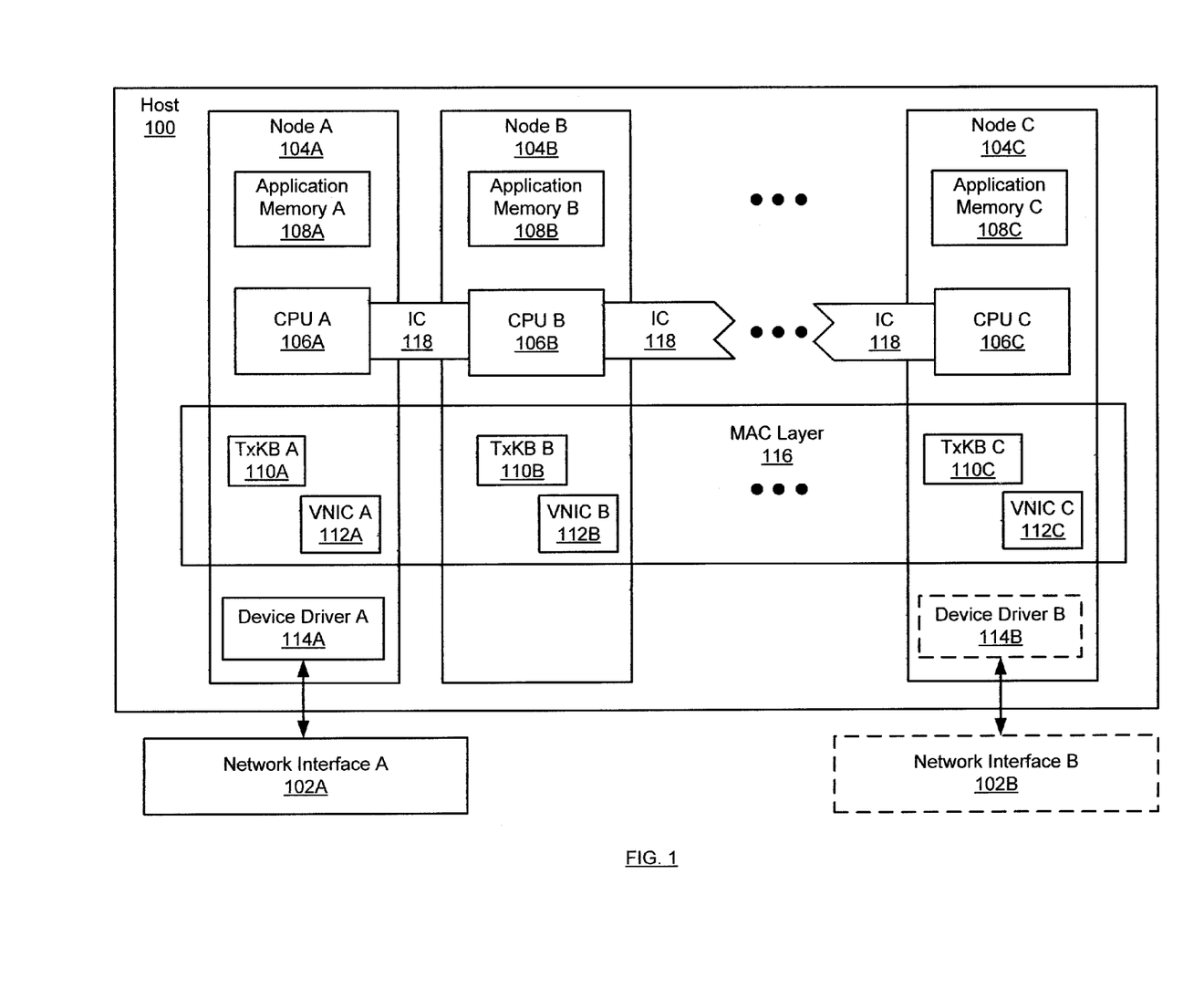
FIG. 1 shows a system that includes a host with multiple nodes in accordance with one or more embodiments of the invention.

FIG. 1 shows a system in accordance with one embodiment of the invention. As shown in FIG. 1, the system includes a host (100) operatively connected to one or more physical network interfaces (NI) (102A, 102B). Each NI (102A, 102B) provides an interface between the host (100) and a network (not shown) (e.g., a local area network, a wide area network, a wireless network, etc.). Each NI (102A, 102B) may correspond to a single network interface card (NIC), which includes a physical interface (not shown) (i.e., the hardware on the NIC used to interface with the network). For example, the physical interface may correspond to an RJ-45 connector, a wireless antenna, etc. The packets received by the physical interface are then forwarded to other components on the NIC for processing, etc. In one embodiment of the invention, the NI (102A, 102B) corresponds to an aggregation of NICs.

Continuing with the discussion of FIG. 1, in one embodiment of the invention, the host (100) includes three or more nodes (104A, 104B, 104C). Each node (104A, 104B, 104C) includes a central processing unit (CPU) (106A, 106B, 106C), an application memory (108A, 108B, 108C), a transmit kernel buffer (TxKB) (110A, 110B, 110C) and a virtual network interface card (VNIC) (112A, 112B, 112C).

In one embodiment of the invention, each VNIC is located within the media access control (MAC) layer of the host. The VNICs provide an abstraction layer between the physical NIC and the various packet destinations (not shown) on the host. More specifically, each VNIC operates like a physical NIC. For example, in one embodiment of the invention, each VNIC is associated with one or more MAC addresses, one or more Internet Protocol (IP) addresses, one or more ports, and configured to handle one or more protocol types. Thus, while the host may be operatively connected to a single physical NIC, packet destinations and other applications on the host operate as if the host is bound to multiple physical NICs. Said another way, each VNIC operates like a separate network device connected to the network.

In one embodiment of the invention, one or more of the nodes (104A, 104B, 104C) may be associated with one or more NICs (102A, 102B). As depicted in FIG. 1, node A (104A) is associated with NIC A (102A). Node A (104A) includes a device driver (114A), which facilitates the transmission of packets from the host (100) to NIC A (102A).

In one embodiment of the invention, the system architecture depicted in FIG. 1 may operate as a system with non-uniform memory architecture (NUMA). Specifically, the system architecture may include multiple processors (CPU A (106A) CPU B (106B) CPU C (106C)) each associated with its own local memory, which includes local application memory (108A) and local kernel memory. A portion of the local kernel memory may be allocated for use as a TxKB (110A, 110B, 110C). In one embodiment of the invention, the memory associated with a CPU (106A, 106B, 106C) is physically closer to that CPU then to other CPUs on the system. In addition, each portion of memory may be under the control of a separate memory manager. Such an architecture may enable programs executing on one CPU (106A, 106B, 106C) to perform more efficiently by utilizing memory specifically for use by the CPU (106A, 106B, 106C). Said another way, the above-described architecture may operate more efficiently than an architecture where all CPUs are competing for memory from a single memory manager. Other embodiments of the invention may be implemented on system architectures other than those described above.

In one embodiment of the invention, the TxKBs (110A, 110B, 110C) are portions of physical memory used by the kernel to temporarily store outgoing data. In one embodiment of the invention, the TxKBs (110A, 110B, 110C) are associated with each node (104A, 104B, 104C), and have been allocated to facilitate the transmission of data from application memory to a NIC (e.g., NIC A (102A)) or other destinations on the host (100).

In one embodiment of the invention, each node represents a group of elements associated with a CPU (104A, 104B, 104C). As depicted in FIG. 1, the application memory A (108A), TxKB A (110A), VNIC A (112A), and device driver A (114A) are associated with CPU A (106A). In one embodiment of the invention, the software elements (e.g., VNIC A (112A), device driver A (114A)) within node A (104A) are executing on the associated CPU (e.g., software elements VNIC A (112A) and device driver A (114A) are executing on CPU A (106A)). Further, CPU A (106A) utilizes the memory within node A (application memory A (108A), TxKB A (110A)) to execute programs and kernel processes assigned to node A (104A).

In one embodiment of the invention, each node (104A, 104B, 104C) may request access to the memory and devices associated with other nodes (104A, 104B, 104C) via the interconnect (IC) (118). In one embodiment of the invention, the IC (118) is a physical link (or series of physical links) between nodes capable of transmitting instructions, requests, and data between nodes (104A, 104B, 104C) connected to the IC (118). In one embodiment of the invention, once the MAC layer (116) is informed of the existence of the data and the destination address of the data, the MAC layer (116) determines where on the host (100) to allocate a TxKB (110A, 110B, 110C) for use by an application. Using the IC (118), the MAC layer (116) may allocate a TxKB (110A, 110B, 110C) within the portion of kernel memory associated with the node transmitting the data. Alternatively, the MAC layer (116) may allocate a TxKB (110A, 110B, 110C) within the portion of kernel memory associated with a different node. For example, if node C is transmitting data via NIC A (102A) associated with node A (104A), the MAC layer (116) may allocate a TxKB within the portion of kernel memory associated with node A (104A) (e.g., TxKB A (110A)). Alternatively, the MAC layer (116) may allocate a TxKB within the portion of kernel memory associated with node B (104B) (e.g., TxKB B (110B)), which may be physically located between node A (104A) and node C (104C).

In one embodiment of the invention, the determination by the MAC layer (116) regarding where to allocate a TxKB is made based on the location of the application memory (108A, 108B, 108C), the location of available TxKB (110A, 110B, 110C), and the location of available NICs (102A, 102B). The availability of a resource may be determined based on a number of factors. For example, a resource may been unavailable if the resource is currently in use or reserved for use by another process. In one embodiment of the invention, the determination regarding the availability of a resource is based upon a measurement of a metric associated with the resource (e.g., the current efficiency of that resource, the current rate at which requests are serviced, a prediction of overutilization of that resource, etc.).

In one embodiment of the invention, the determination by the MAC layer (116) regarding the allocation of the TxKB is made in accordance with an allocation policy. Such a policy may detail where and in what order TxKBs are to be allocated in order to achieve a policy objective. Further, the allocation policy may also describe the conditions under which a resource is unavailable. In one embodiment of the invention, the policy objective is to increase the overall efficiency of data transmission the system. In one embodiment of the invention, the policy objective may be to reduce the overall physical distance the data travels once inside the host (100). In one embodiment of the invention, the policy objective may be to favor the data transmitted from one application or node over another. Those skilled in the art will appreciate that policy objectives other than those described above may be implemented without exceeding the scope of the invention.

Figure 2:
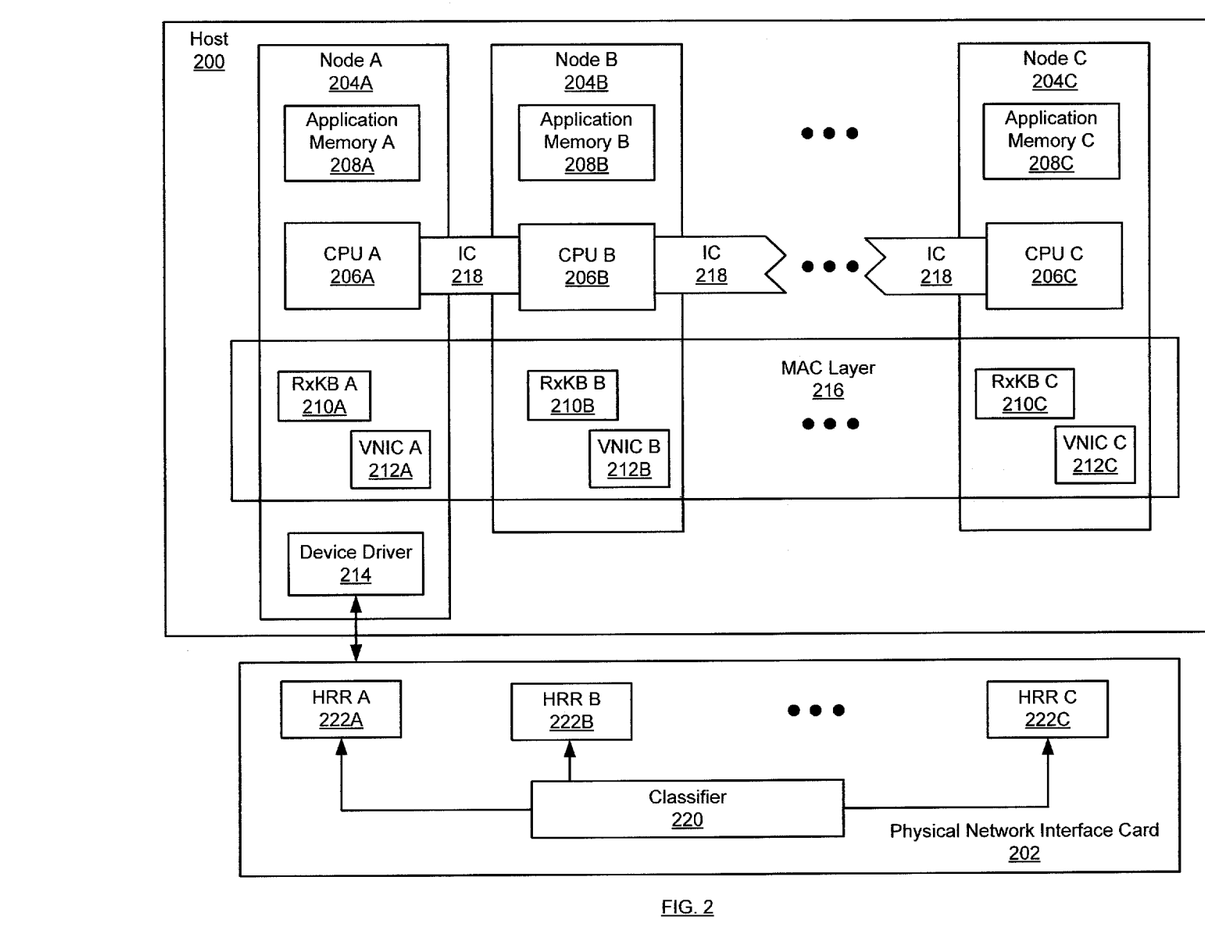
FIG. 2 shows a system that includes a host with multiple nodes operatively connected to a physical network interface card in accordance with one or more embodiments of the invention.

FIG. 2 shows a system in accordance with one embodiment of the invention. As shown in FIG. 2, the system includes a host (200) operatively connected to a NIC (202). In one embodiment of the invention, the NIC (202) includes a classifier (220) and three or more hardware receive rings (HRR) (222A, 222B, 222C) used to receive and transmit network traffic. In one embodiment of the invention, the HRRs (222A, 222B, 222C) correspond to portions of memory within the NIC (202) used to temporarily store packets before the packets are copied to the host (200). In one embodiment of the invention, the classifier (220) is configured to analyze the incoming network traffic, and forward that traffic to one of the HRRs (222A, 22B, 222C). In one embodiment of the invention, data arriving on the NIC (202) is classified and forwarded to the HRR associated with the destination of that data (e.g., data addressed to node A (204A) is forwarded to HRR A (222A) by the classifier (220)).

As depicted in FIG. 2, each node (204A, 204B, 204C) includes a receive kernel buffer (RxKB) (210A, 210B, 210C). The RxKBs (210A, 210B, 210C) are allocated by the MAC layer in a manner similar to the process described in regard to the TxKBs in FIG. 1 (110A, 110B, 110C in FIG. 1). In one embodiment of the invention, the determination by the MAC layer (216) regarding where to allocate a RxKB (210A, 210B, 210C) is made based on the destination location of the data, the location of the NIC (202), and the location of available RxKB (210A, 210B, 210C). The destination location of the data is determined using the information related to the HRRs (222A, 222B, 222C) on the NIC (202) to which the data was forwarded. For example, data arriving on the NIC (202) addressed to node C (204C) is forwarded to HRR C (222C) by the classifier. Accordingly, the MAC layer (216) allocates a RxKB (210A, 210B, 210C) for incoming data on HRR C (222C) based on the location of node C (204C). In one embodiment of the invention, the determination by the MAC layer (216) is made in accordance with an allocation policy as described above. Other elements depicted in FIG. 2 are substantially similar to those described with regard to FIG. 1.

Figure 3:
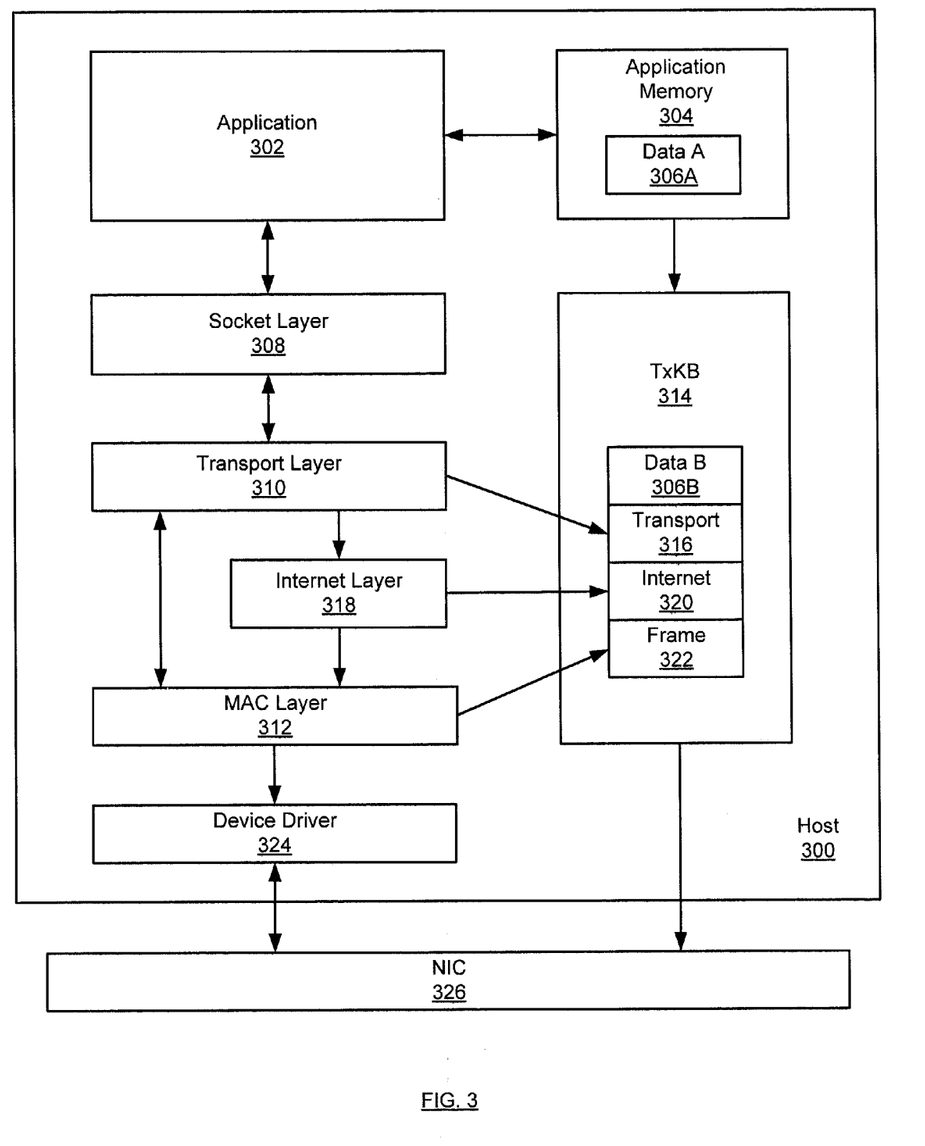
FIG. 3 depicts the relationship between the network layers and the transmit kernel buffers in accordance with one embodiment of the invention.

FIG. 3 depicts the relationship between the network layers and the transmit kernel buffers in accordance with one embodiment of the invention. As shown in FIG. 3, the host (300) includes an application (302) and associated application memory (304). The application memory (304) stores data A (306A) for transmission.

In one embodiment of the invention, the application (302) alerts the socket layer (308) that data A is ready for transmission. The application (302) provides the socket layer (308) with the destination address of the data (306A). The socket layer (308) passes the information related to the data (306) to the transport layer (310). The transport layer (310) informs the MAC layer (312) of the existence of the data (306A) to be transmitted, as well as the destination address of the data. The MAC layer (312) allocates the TxKB (314) in the manner described with reference to FIG. 1.

Continuing with the discussion of FIG. 3, once the MAC layer (312) allocates the TxKB (314), the address of the allocated TxKB is communicated to the transport layer (310). The data (306A) is copied into the TxKB (314) (data B (306B) in TxKB (314)), and each layer appends information to the data (306B) necessary for transmission over the network. As depicted in FIG. 3, the transport layer (310) adds transport layer information (316), which may correspond to a User Datagram Protocol (UDP) header or a Transmission Control Protocol (TCP) header. The internet layer (318) adds internet layer information (320), which may correspond to an Internet Protocol (IP) header. The MAC layer (312) adds link layer information (322), which may correspond to a frame header and footer. Once the data (306B) has been prepared for transport, the device driver (324) is notified, and the data (306B) is copied to the NIC (326) for transmission across the network. In one embodiment of the invention, the data (306B) is transmitted to another element on the host (300). In such a case, the address of the TxKB (314) is passed to elements within the destination node (not shown).

Figure 4:
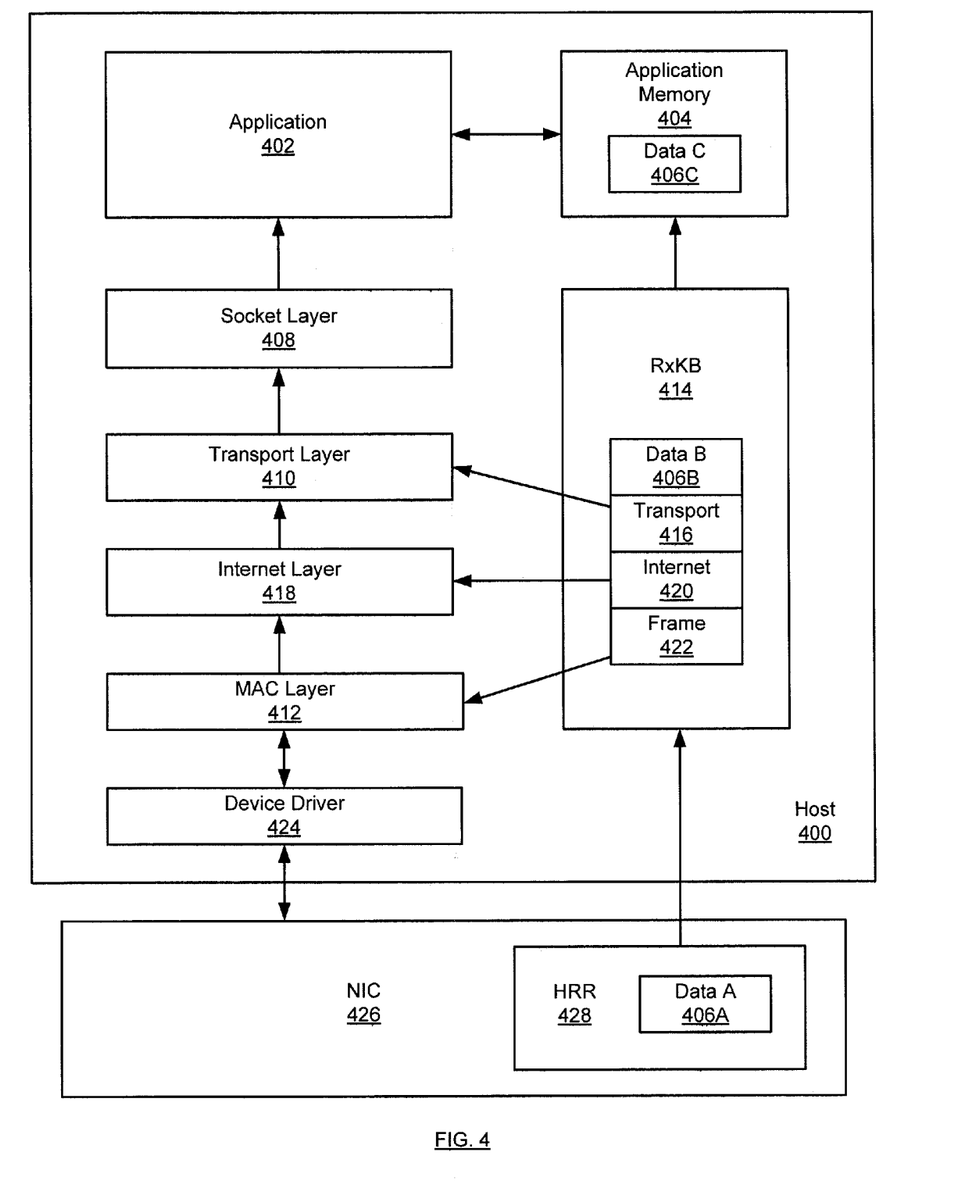
FIG. 4 depicts the relationship between the network layers and the receive kernel buffers in accordance with one embodiment of the invention.

FIG. 4 depicts the relationship between the network layers and the receive kernel buffers in accordance with one embodiment of the invention. As shown in FIG. 4, data A (406A) is copied from the HRR (428) to the RxKB (414) allocated by the MAC layer (412). The MAC layer (412) then interprets and removes the data frame (422). The internet layer (418) then interprets and removes the internet layer information (420) (e.g., an IP header). The transport layer (418) interprets and removes the transport layer information (416) (e.g., a UDP header). The socket layer (408) and application (402) are notified of the existence of data B (406B), and the data is copied into the application memory (404) (data C (406C) in the application memory (404)).

Figure 5:
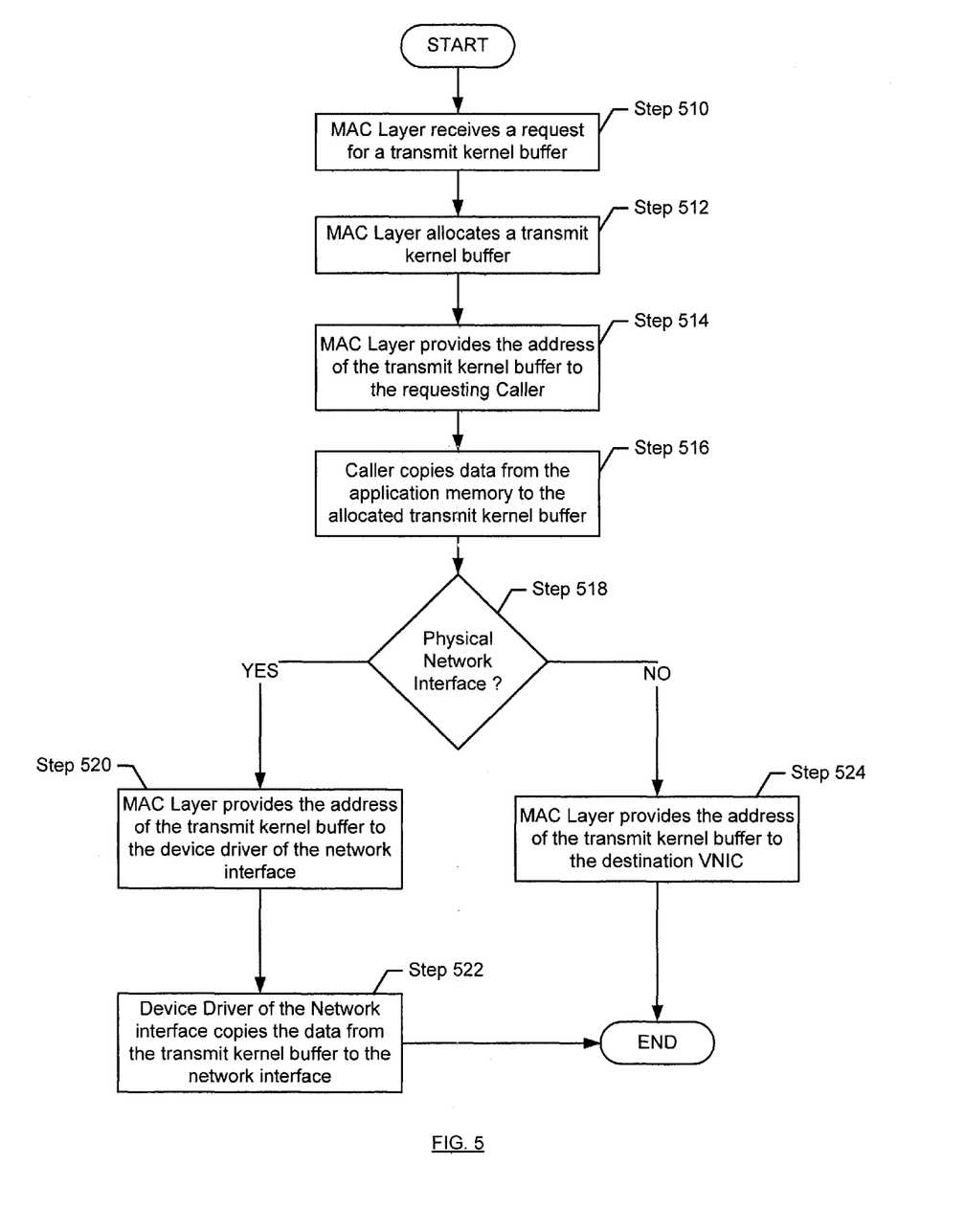
FIG. 5 shows a flow chart for transmitting data in accordance with one or more embodiments of the invention.

FIG. 5 shows a flow chart for transmitting data in accordance with one or more embodiments of the invention. In one or more embodiments of the invention, one or more of the steps shown in FIG. 5 may be omitted, repeated, and/or performed in a different order than that shown in FIG. 5. Accordingly, the specific arrangement of steps shown in FIG. 5 should not be construed as limiting the scope of the invention.

In Step 510, the MAC layer receives a request for a transmit kernel buffer. In Step 512, the MAC layer allocates a transmit kernel buffer. Further details regarding Step 512 are described in reference to FIG. 7. In Step 514, the MAC layer provides the address of the transmit kernel buffer to the requesting caller. In embodiment of the invention, the requesting caller corresponds to the transport layer of the transmitting node. In Step 516, the requesting caller copies data from the application memory to the allocated transmit kernel buffer.

In Step 518, a determination is made regarding whether the data destination is a physical network interface. If the data destination is a physical network interface (e.g., a NIC), then in Step 520, the MAC layer provides the address of the transmit kernel buffer to the device driver of the network interface. In Step 522, the device driver of the network interface copies the data from the transmit kernel buffer to the network interface. If the data destination is not a physical network interface (e.g., the destination is a VNIC on the host), then in Step 524, the MAC layer provides the address of the transmit kernel buffer to the destination VNIC.

Figure 6:
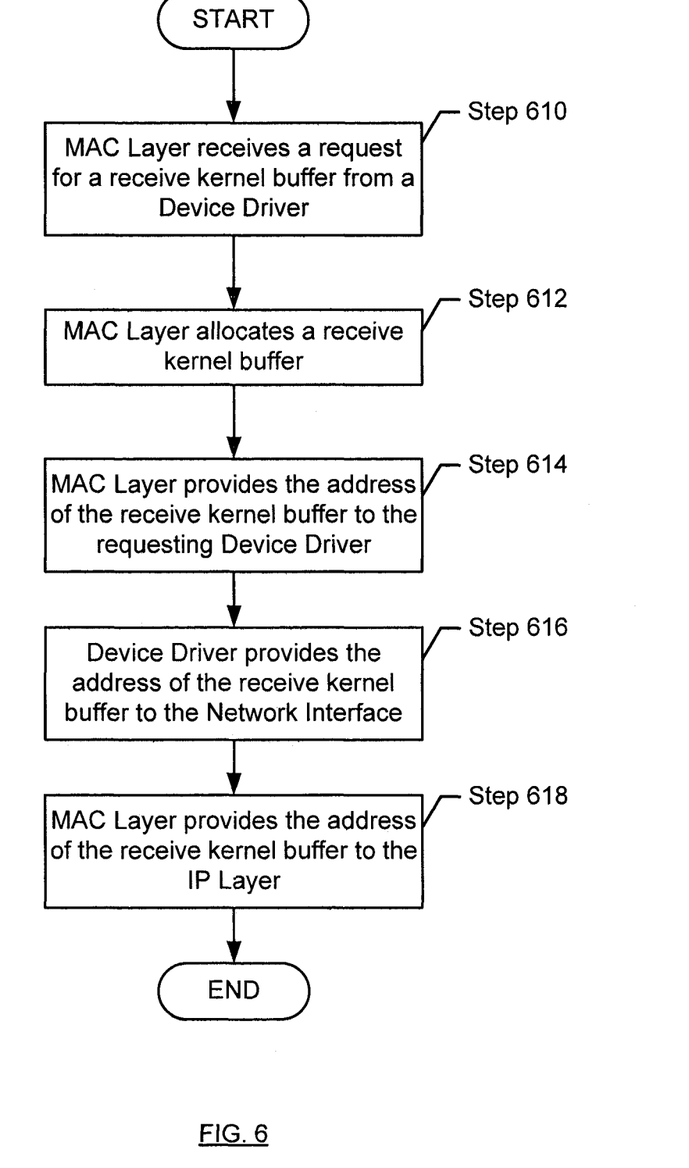
FIG. 6 shows a flow chart for receiving data in accordance with one or more embodiments of the invention.

FIG. 6 shows a flow chart for receiving data in accordance with one or more embodiments of the invention. In one or more embodiments of the invention, one or more of the steps shown in FIG. 6 may be omitted, repeated, and/or performed in a different order than that shown in FIG. 6. Accordingly, the specific arrangement of steps shown in FIG. 6 should not be construed as limiting the scope of the invention.

In Step 610, the MAC layer receives a request for a receive kernel buffer from a device driver. In Step 612, the MAC layer allocates a receive kernel buffer. Further details regarding Step 612 are described in reference to FIG. 8. In Step 614, the MAC layer provides the address of the receive kernel buffer to the requesting device driver. In Step 616, the device driver provides the address of the receive kernel buffer to the network interface (e.g., a NIC). In Step 618, the MAC layer provides the address of the receive kernel buffer to the IP layer.

Figure 7:
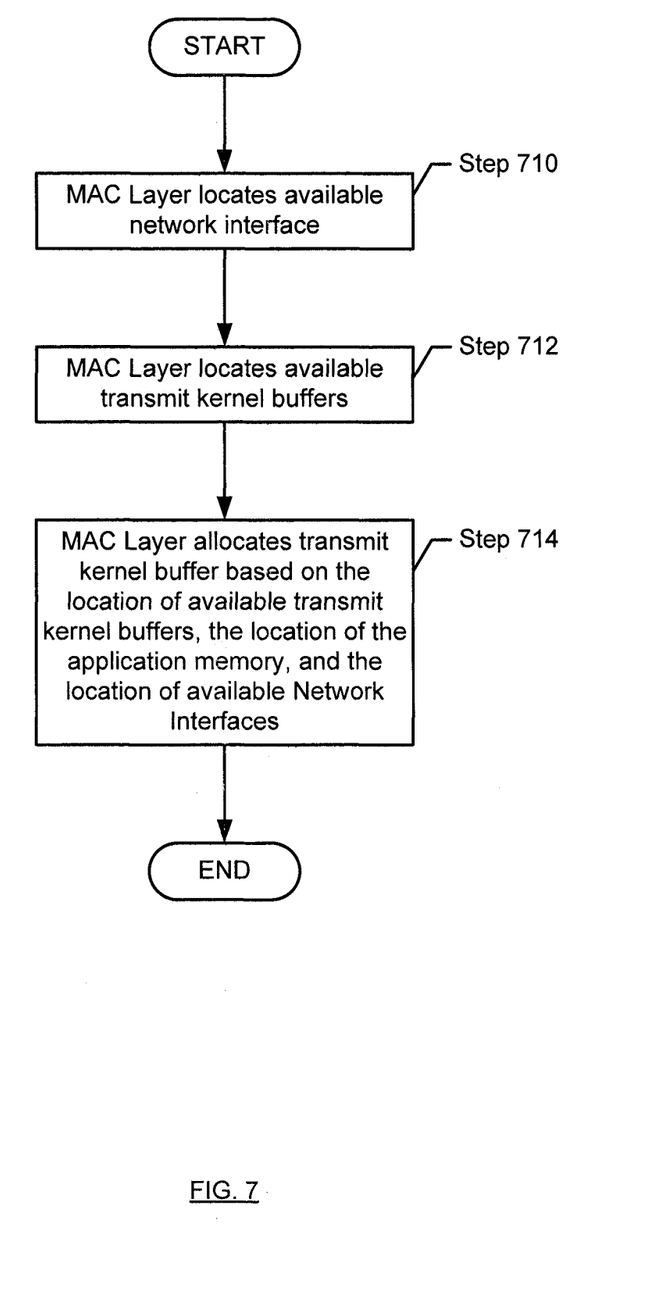
FIG. 7 shows a flow chart detailing the MAC layer allocation of transmit kernel buffers in accordance with one or more embodiments of the invention.

FIG. 7 shows a flow chart detailing the MAC layer allocation of transmit kernel buffers in accordance with one or more embodiments of the invention. In one or more embodiments of the invention, one or more of the steps shown in FIG. 7 may be omitted, repeated, and/or performed in a different order than that shown in FIG. 7. Accordingly, the specific arrangement of steps shown in FIG. 7 should not be construed as limiting the scope of the invention.

In Step 710, the MAC layer locates the available network interface. In Step 712, the MAC layer locates the available (i.e., not currently in use) transmit kernel buffers. In Step 714, the MAC layer allocates transmit kernel buffer based on the location of the available transmit kernel buffers, the location of the application memory, and the location of available network interfaces.

Figure 8:
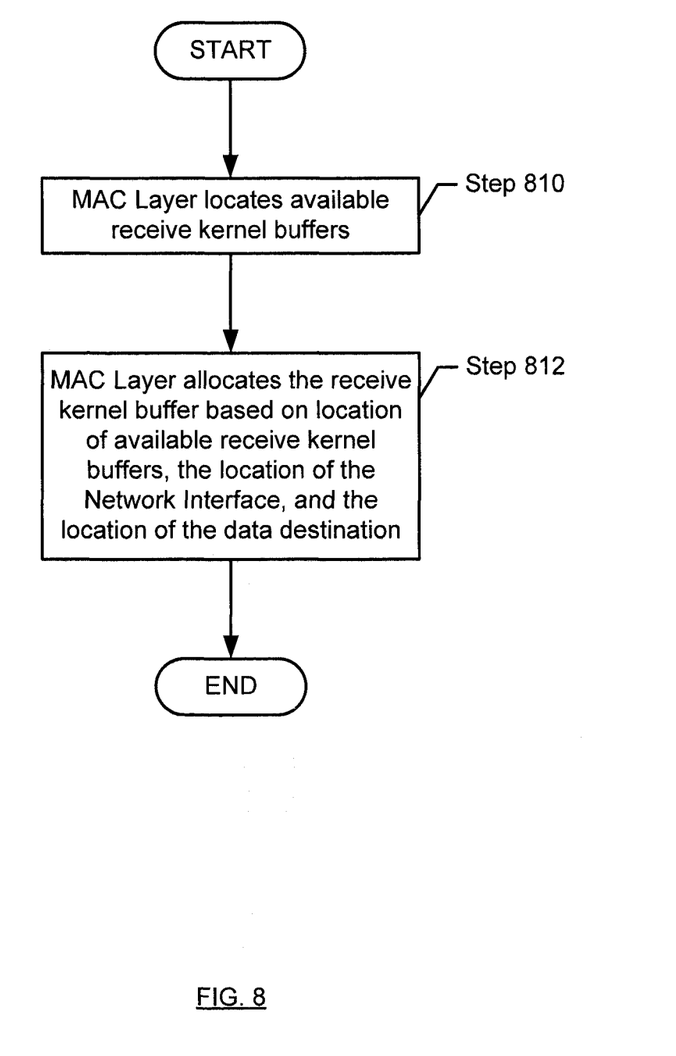
FIG. 8 shows a flow chart detailing the MAC layer allocation of receive kernel buffers in accordance with one or more embodiments of the invention.

FIG. 8 shows a flow chart detailing the MAC layer allocation of receive kernel buffers in accordance with one or more embodiments of the invention. In one or more embodiments of the invention, one or more of the steps shown in FIG. 8 may be omitted, repeated, and/or performed in a different order than that shown in FIG. 8. Accordingly, the specific arrangement of steps shown in FIG. 8 should not be construed as limiting the scope of the invention.

In Step 810, the MAC layer locates the available (i.e., not currently in use) receive kernel buffers. In Step 812, the MAC layer allocates the receive kernel buffer based on location of available receive kernel buffers, the location of the network interface, and the location of the data destination.

Figure 9:
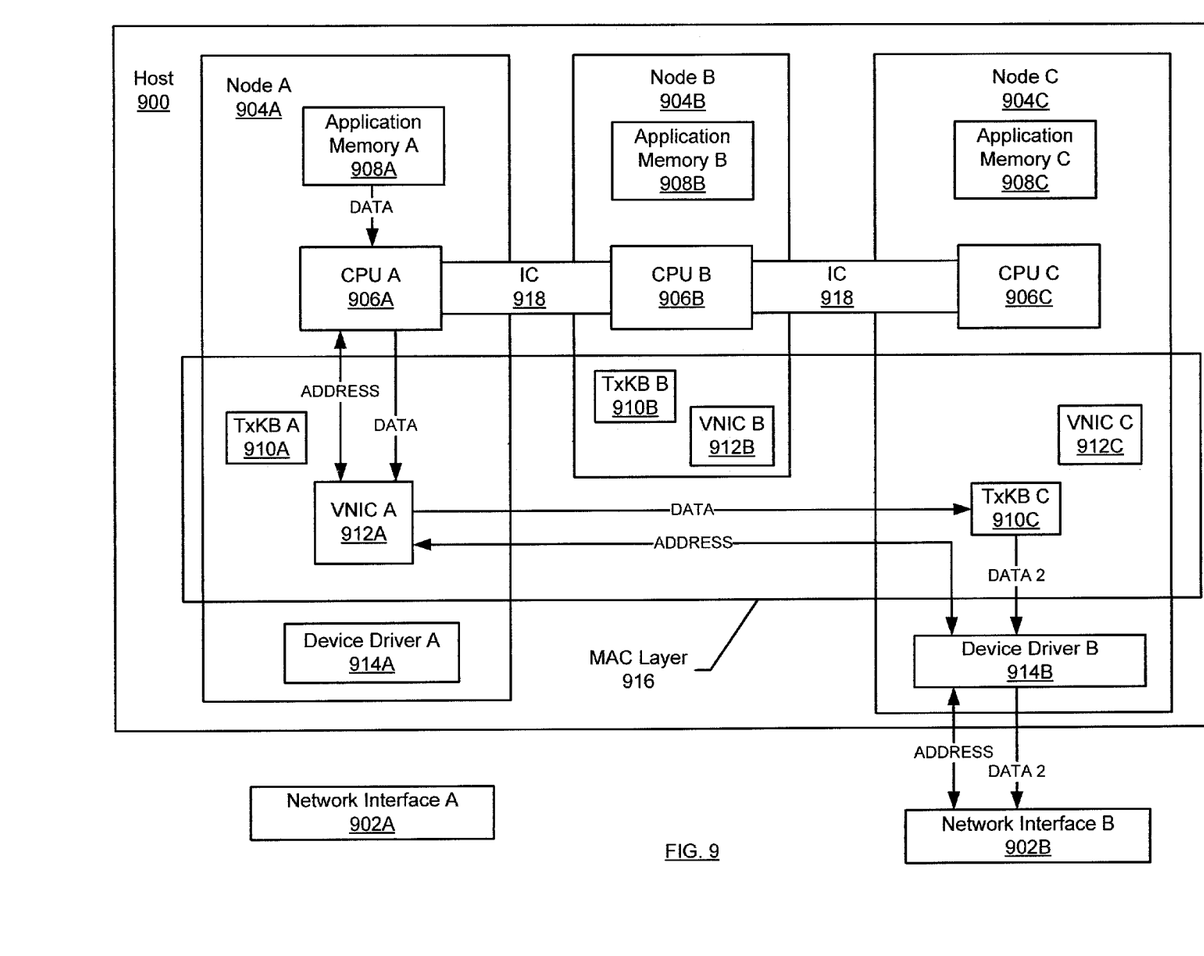
FIG. 9 shows an exemplary system in accordance with one embodiment of the invention in which data is transmitted.

FIG. 9 shows an exemplary system in accordance with one embodiment of the invention in which data is transmitted. The exemplary system is not intended to limit the scope of the invention. Further, some elements unnecessary for the purposes of the exemplary figure may have been omitted.

As depicted in FIG. 9, the host (900) includes three nodes (904A, 904B, 904C). Each node includes an associated CPU (906A, 906B, 906C), application memory (908A, 908B, 908C), TxKBs (910A, 910B, 910C), and VNICs (912A, 912B, 912C). Node A (904A) and node B (904B) are each associated with a network interface (902A, 902B) and a corresponding device driver (914A, 914B). The TxKBs (910A, 910B, 910C) and VNICs (912A, 912B, 912C) conceptually exist within the MAC layer (916) of the host (900). Those skilled in the art will appreciate that the TxKBs are physically located within the memory of the corresponding node.

Continuing with the discussion of exemplary FIG. 9, assume that an application associated with node A (904A) has initiated the transmission of data onto the network. Assume also, for the purpose of exemplary FIG. 9, that network interface A (902A) is unavailable, and network interface B (902B) is available. Further, assume the following (i) that TxKB A (910A) is unavailable, and TxKB B (910B) and TxKB C (910C) are available; (ii) the allocation policy requires that resources be selected in order to minimize the physical distance data must travel from application memory to network interface; (iii) TxKBs associated with either the sending node or the node associated with the destination element (e.g., a network interface) are given priority over other nodes; and (iv) the physical configuration of the embodiment represented by FIG. 9 is substantially accurate (i.e., node A (904A) is physically closer to node B (904B) than to node C (904C), etc.).

Turning to the example, the MAC layer (916) receives the request for a TxKB. The MAC layer (916) then locates an available network interface. As described above, network interface A (902A) is unavailable. The MAC layer (916) then determines that network interface B (902B) is available. The MAC layer (916) is notified that both TxKB B (910B) and TxKB C (910C) are available. The allocation policy dictates that TxKBs must be allocated such that resources be selected in order to minimize the physical distance data must travel, and TxKBs associated with either the sending node or the node associated with the destination element (e.g., a network interface) are given priority over other nodes. Therefore, the MAC layer (916) allocates TxKB C (910C).

Continuing with the discussion of exemplary FIG. 9, the address of the allocated TxKB (TxKB C (910C)) is provided to the requesting process, and the data is copied from the application memory (908A), via VNIC A (912A), to TxKB C (910C). The address of the outgoing data is then provided to the network interface, via device driver B (914B). Finally, the data is copied to the network interface (902B), and transmitted over the network.

Figure 10:
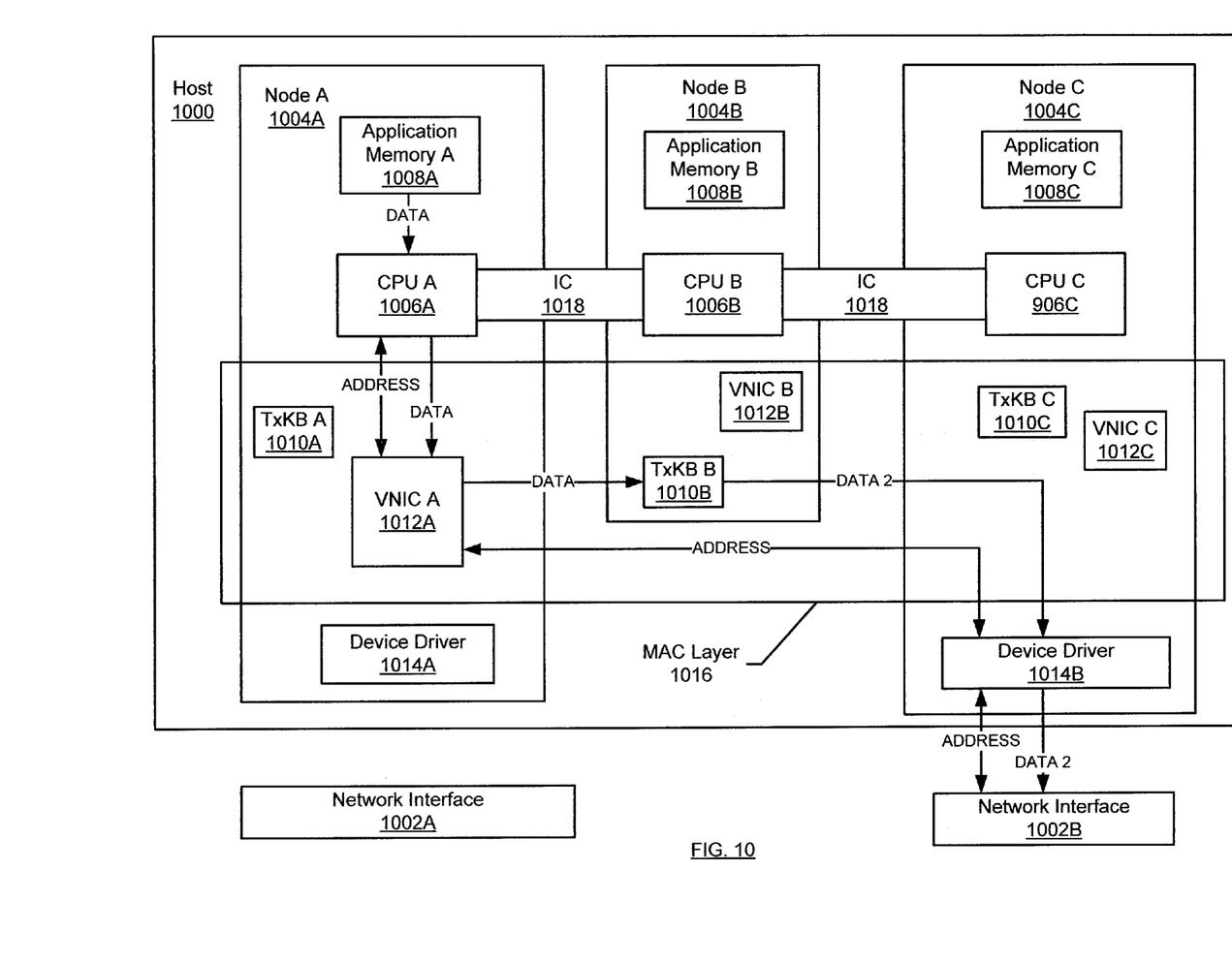
FIG. 10 shows an exemplary system in accordance with one embodiment of the invention in which data is transmitted.

FIG. 10 shows an exemplary system in accordance with one embodiment of the invention in which data is transmitted. The exemplary system is not intended to limit the scope of the invention. Further, some elements unnecessary for the purposes of the exemplary figure may have been omitted.

The exemplary system depicted in FIG. 10 is substantially similar to the exemplary system depicted in FIG. 9. Similar to the assumptions described with regard to FIG. 9, assume that an application associated with node A (1004A) has initiated the transmission of data onto the network. Assume also that network interface A (1002A) is unavailable, and network interface B (1002B) is available. Also, as in FIG. 9, assume that the allocation policy requires that resources be selected in order to minimize the physical distance data must travel from application memory to network interface, and TxKBs associated with either the sending node or the node associated with the destination element (e.g., a network interface) are given priority over other nodes. Assume, finally that the physical configuration of the embodiment represented by FIG. 10 is substantially accurate (i.e., node A (1004A) is physically closer to node B (1004B) than to node C (1004C), etc.). However, for the purposes of exemplary FIG. 10, assume that both TxKB A (1010A) and TxKB C (1010C) are unavailable, and TxKB B (1010B) is available.

The MAC layer (1016) receives the request for a TxKB. The MAC layer (1016) then locates an available network interface. As described above, network interface A (1002A) is unavailable. The MAC layer (1016) then determines that network interface B (1002B) is available. The MAC layer (1016) is notified that only TxKB B (1010B) is available. Therefore, the MAC layer (1016) allocates TxKB B (1010B).

Continuing with the discussion of exemplary FIG. 10, the address of the allocated TxKB (TxKB B (1010C)) is provided to the requesting process, and the data is copied from the application memory (1008A), via VNIC A (1012A), to TxKB B (1010B). The address of the outgoing data is then provided to the network interface, via device driver B (914B). Finally, the data is copied to the network interface (1002B), and transmitted over the network.

Figure 11:
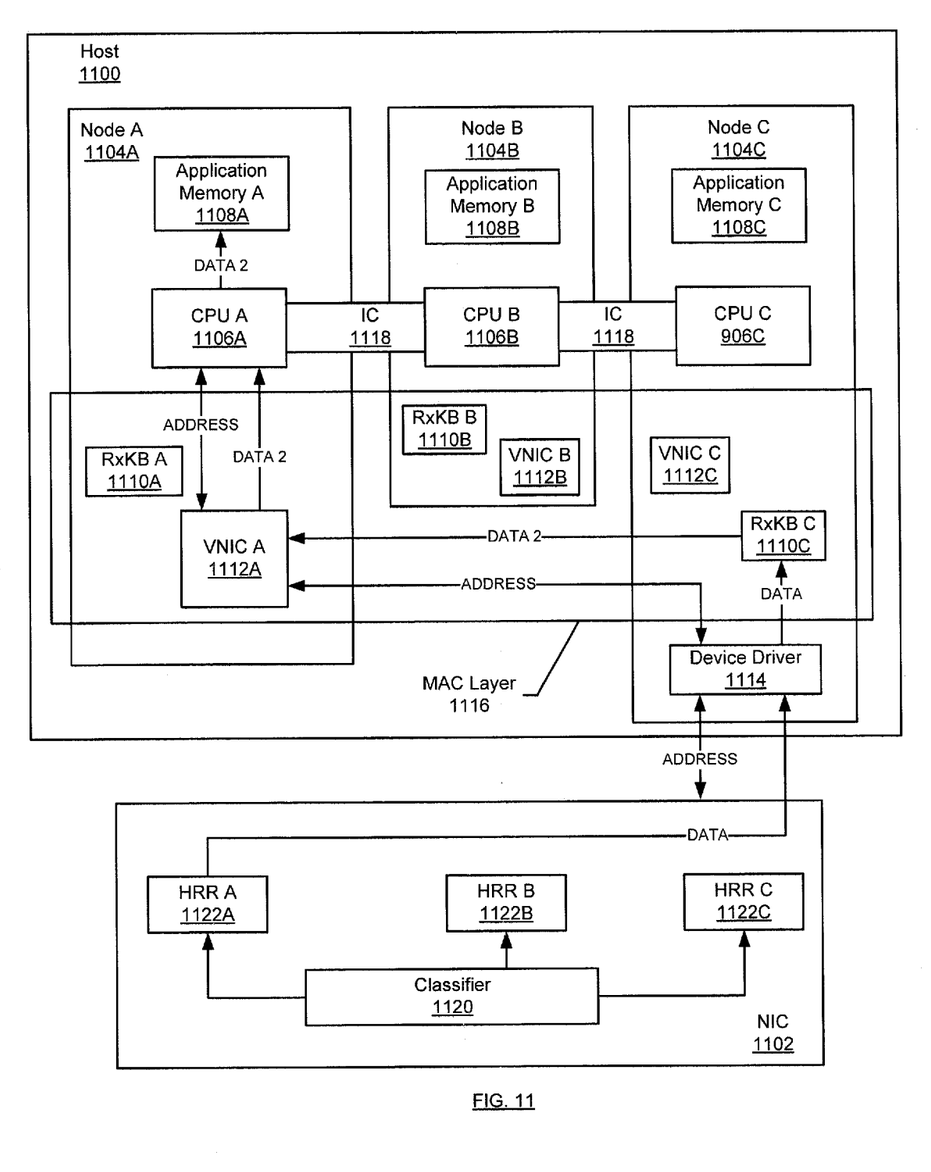
FIG. 11 shows an exemplary system in accordance with one embodiment of the invention in which data is received.

FIG. 11 shows an exemplary system in accordance with one embodiment of the invention in which data is received. The exemplary system is not intended to limit the scope of the invention. Further, some elements unnecessary for the purposes of the exemplary figure may have been omitted.

As depicted in FIG. 11, the host (1100) includes three nodes (1104A, 1104B, 1104C). Each node includes an associated CPU (1106A, 1106B, 1106C), application memory (1108A, 1108B, 1108C), RxKBs (1110A, 1110B, 1110C), and VNICs (1112A, 1112B, 1112C). Node C (1104C) is associated with a NIC (1102). The NIC (1102) includes a classifier (1120) and three HRRs (1122A, 1122B, 1122C). Incoming data is classified by the classifier based on the destination node. Specifically, data addressed to node A (1104A) is forwarded by the classifier to HRR A (1122A), data addressed to node B (1104B) is forwarded by the classifier to HRR B (1122B), and data addressed to node C (1104C) is forwarded by the classifier to HRR C (1122C). Data is transferred from each HRR (1122A, 1122B, 1122C) to the destination node via the device driver (1114). The TxKBs (1110A, 1110B, 1110C) and VNICs (1112A, 1112B, 1112C) conceptually exist within the MAC layer (1116) of the host (1100). Those skilled in the art will appreciate that the TxKBs are physically located within the memory of the host.

Continuing with the discussion of exemplary FIG. 11, assume that the NIC (1102) receives data addressed to a process executing on CPU A (1106A). Assume, for the purpose of exemplary FIG. 11, that RxKB A (1110A) is unavailable, and RxKB B (1110B) and RxKB C (1110C) are available. Also, assume that the allocation policy requires that resources be selected in order to minimize the physical distance data must travel from the NIC (1102) to the application memory (1108A, 1108B, 1108C), and RxKBs associated with either the node associated with the NIC (1102) or the node associated with the destination process are given priority over other nodes. Finally, assume that the physical configuration of the embodiment represented by FIG. 11 is substantially accurate (i.e., node A (1104A) is physically closer to node B (1104B) than to node C (1104C), etc.).

Data addressed to node A (1108A) and received by the NIC (1102) is classified by the classifier (1102) and forwarded to HRR A (1122A). The NIC notifies VNIC A (1112A) of incoming data. The MAC layer (1116) has allocated RxKB C (1110C) to receive the data addressed to node A (1104A). The device driver and NIC are notified of the address of RxKB C (1110C). The data is copied from HRR A (1122A) into RxKB C (1110C), via the device driver (1114). The address of RxKB C (111C) is then provided to the requesting process. Finally, the data is copied into application memory A (1108A), via VNIC A (1112A).

Figure 12:
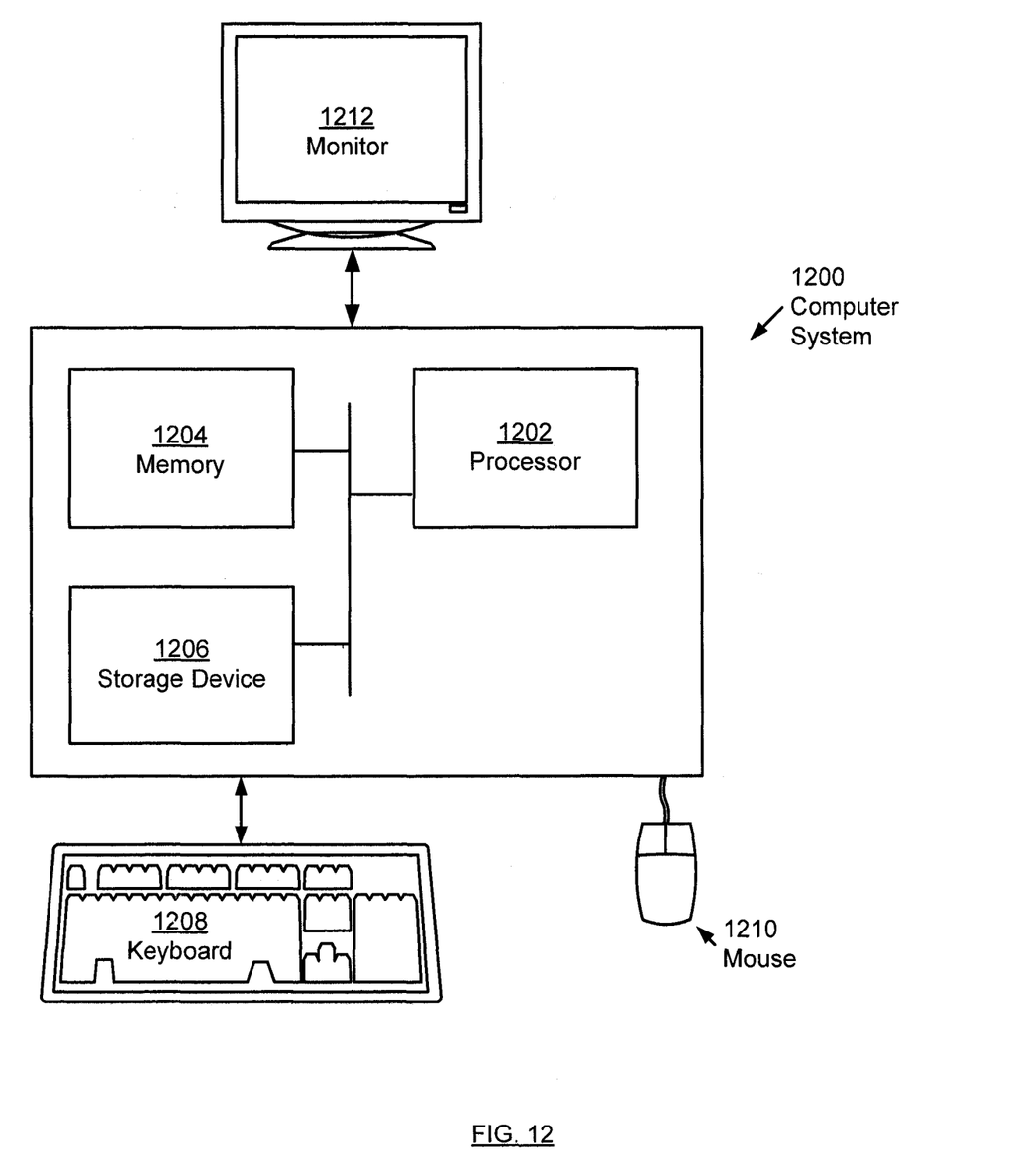
FIG. 12 shows a computer system on which one or more embodiments of the invention may be implemented.

An embodiment of the invention may be implemented on virtually any type of computer regardless of the platform being used. For example, as shown in FIG. 12, a networked computer system (1200) includes a processor (1202), associated memory (1204), a storage device (1206), and numerous other elements and functionalities typical of today's computers (not shown). The networked computer (1200) may also include input means, such as a keyboard (1208) and a mouse (1210), and output means, such as a monitor (1212). The networked computer system (1200) is connected to a local area network (LAN) or a wide area network via a network interface connection (not shown). Those skilled in the art will appreciate that these input and output means may take other forms. Further, those skilled in the art will appreciate that one or more elements of the aforementioned computer (1200) may be remotely located and connected to the other elements over a network. Further, software instructions to perform embodiments of the invention may be stored on a computer readable medium such as a compact disc (CD), a diskette, a tape, or any other physical computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A non-transitory computer readable medium comprising software instructions, which when executed by a processor, perform a method, the method comprising:
   obtaining an allocation policy by a media access card (MAC) layer executing on a host wherein the host comprises a plurality of nodes, and wherein each of the plurality of nodes comprises at least one of a plurality of processors and one of a plurality transmit kernel buffers (TxKBs);
   receiving, by the MAC layer, a request for a TxKB of the plurality of TxKBs by a sending application executing on at least one of the plurality of processors;
   obtaining, by the MAC layer, a location of a plurality of available TxKBs on the host, wherein each of the plurality of available TxKBs is one of the plurality of TxKBs;
   obtaining, by the MAC layer, a location of at least one available network interface on the host;
   obtaining, by the MAC layer, a location of the sending application;
   allocating, by the MAC layer, one of the plurality of available TxKBs to obtain an allocated TxKB, wherein the one of the plurality of available TxKBs is selected according to the allocation policy using the location of each of the plurality of available TxKB, the location of the at least one available network interface, and the location of the sending application; and
   providing, to the sending application, the location of the allocated TxKB.

2. The non-transitory computer readable medium of claim 1, wherein the location of each of the plurality of TxKBs is one of the plurality of nodes.

3. The non-transitory computer readable medium of claim 1, wherein the host is a computing system with non-uniform memory architecture.

4. The non-transitory computer readable medium of claim 1, wherein a first one of the plurality of nodes comprises the allocated TxKB.

5. The non-transitory computer readable medium of claim 4, wherein a second one of the plurality of nodes comprises the sending application.

6. The non-transitory computer readable medium of claim 4, wherein a second one of the plurality of nodes comprises the at least one available network interface and wherein the at least one network interface is one selected from a group consisting of a virtual network interface card (VNIC) and a NIC.

7. A system for allocating network buffers, comprising:
   a host comprising:
      a plurality of nodes, wherein each of the plurality of nodes comprises:
         at least one of a plurality of processors; and
         one of a plurality of transmit kernel buffers (TxKBs);
      a media access card (MAC) layer, configured to:
         obtain an allocation policy;
         receive a request for a TxKB of the plurality of TxKBs by a sending application executing on a first one of the plurality of nodes;
         obtain a location of a plurality of available TxKBs, wherein each of the plurality of available TxKBs is one of the plurality of TxKBs;
         obtain a location of at least one available network interface;
         obtain a location of the sending application;
         allocating one of the plurality of available TxKBs to obtain an allocated TxKB, wherein the one of the plurality of available TxKBs is selected according to the allocation policy using the location of the plurality of TxKB, the location of the at least one available network interface, and the location of the sending application; and providing, to the sending application, the location of the allocated TxKB.

8. The system of claim 7, wherein the location of the plurality of available TxKB is one of the plurality of nodes.

9. The system of claim 7, wherein the host is a computing system with non-uniform memory architecture.

10. The system of claim 7, wherein a second one of the plurality of nodes comprises at least one of the plurality of available TxKB.

11. The system of claim 7, wherein a second one of the plurality of nodes comprises the allocated TxKB.

12. The system of claim 7, wherein the network interface is one selected from a group consisting of a physical network interface card and a virtual network interface card.

13. A non-transitory computer readable medium comprising software instructions, which when executed by a processor, perform a method, the method comprising:
  obtaining an allocation policy by a media access card (MAC) layer executing on a host, wherein the host comprises a plurality of nodes, and wherein each of the plurality of nodes comprises at least one of a plurality of processors and one of a plurality receive kernel buffers (RxKBs);
  receiving, by the MAC layer, a request for a RxKB of the plurality of RxKBs by a network interface;
  obtaining, by the MAC layer, a location of a plurality of available RxKBs on the host, wherein each of the plurality of available RxKBs is one of the plurality of RxKBs;
  obtaining, by the MAC layer, a destination associated with the request for the RxKB;
  obtaining, by the MAC layer, a location of the network interface;
  allocating, by the MAC layer, one of the plurality of available RxKBs to obtain an allocated RxKB, wherein the one of the plurality of available RxKBs is selected according to the allocation policy using the location of the plurality of available RxKB, the destination associated with the request for the RxKB, and the location of the network interface; and
  providing, to the network interface, the location of the allocated RxKB.

14. The non-transitory computer readable medium of claim 13, wherein the location of each of the plurality of available RxKBs is one of the plurality of nodes.

15. The non-transitory computer readable medium of claim 13, wherein the host is a computing system with non-uniform memory architecture.

16. The non-transitory computer readable medium of claim 13, wherein a first one of the plurality of nodes comprises the allocated RxKB.

17. The non-transitory computer readable medium of claim 16, wherein a second one of the plurality of nodes comprises the network interface.

18. The non-transitory computer readable medium of claim 16, wherein a second one of the plurality of nodes comprises the destination associated with the request for the RxKB.

* * * * *

UNITED STATES PATENT AND TRADEMARK OFFICE
CERTIFICATE OF CORRECTION

PATENT NO. : 8,478,877 B2
APPLICATION NO. : 12/711711
DATED : July 2, 2013
INVENTOR(S) : Droux et al.

Page 1 of 1

It is certified that error appears in the above-identified patent and that said Letters Patent is hereby corrected as shown below:

In the Specification:

In column 5, line 13, delete "22B," and insert -- 222B, --, therefor.

In the Claims:

In column 9, line 67, in Claim 1, delete "host" and insert -- host, --, therefor. (First occurrence)

In column 10, line 3, in Claim 1, after "plurality" insert -- of --.

In column 11, line 22, in Claim 13, after "plurality" insert -- of --.

Signed and Sealed this
Twenty-second Day of October, 2013

Teresa Stanek Rea
*Deputy Director of the United States Patent and Trademark Office*